United States Patent
Gonzalez et al.

(10) Patent No.: US 12,541,025 B2
(45) Date of Patent: Feb. 3, 2026

(54) FIREARM DISCHARGE LOCATION SYSTEMS AND ASSOCIATED METHODS

(71) Applicant: Battelle Memorial Institute, Richland, WA (US)

(72) Inventors: Eric G. Gonzalez, Richland, WA (US); Michael S. Hughes, Richland, WA (US); Anton S. Sinkov, Richland, WA (US); James R. Skorpik, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 510 days.

(21) Appl. No.: 17/009,598

(22) Filed: Sep. 1, 2020

(65) Prior Publication Data
US 2021/0080570 A1 Mar. 18, 2021

Related U.S. Application Data

(60) Provisional application No. 62/895,397, filed on Sep. 3, 2019.

(51) Int. Cl.
*G01S 15/46* (2006.01)
*H04R 29/00* (2006.01)

(52) U.S. Cl.
CPC ............ *G01S 15/46* (2013.01); *H04R 29/005* (2013.01)

(58) Field of Classification Search
None
See application file for complete search history.

(56) References Cited

U.S. PATENT DOCUMENTS

| | | | |
|---|---|---|---|
| 6,178,141 B1 * | 1/2001 | Duckworth | ............. F41H 11/00 367/124 |
| 7,126,877 B2 * | 10/2006 | Barger | ....................... F41J 5/06 367/127 |

(Continued)

FOREIGN PATENT DOCUMENTS

| | | |
|---|---|---|
| CN | 103852746 | 6/2014 |
| EP | 1806952 | 7/2007 |

(Continued)

OTHER PUBLICATIONS

Albert et al., "Time Reversal Processing for Source Location in an Urban Environment", The Journal of the Acoustical Society of America, Aug. 2005, United States, pp. 616-619.

(Continued)

*Primary Examiner* — Isam A Alsomiri
*Assistant Examiner* — Vikas Atmakuri
(74) *Attorney, Agent, or Firm* — Wells St. John P.S.

(57) ABSTRACT

Firearm discharge location systems and associated methods are described. According to one aspect, a firearm discharge location system includes a plurality of microphone devices individually configured to receive acoustic signals of a firearm discharge and to generate information regarding the received acoustic signals of the firearm discharge, a locator system configured to identify a plurality of locations of the microphone devices during the generation of the information regarding the received acoustic signals of the firearm discharge by the microphone devices, and processing circuitry configured to use the identified locations of the microphone devices and the information regarding the received acoustic signals of the firearm discharge to identify the location of the firearm discharge.

31 Claims, 4 Drawing Sheets

(56) References Cited

U.S. PATENT DOCUMENTS

| | | | | |
|---|---|---|---|---|
| 7,433,266 | B2* | 10/2008 | Ledeczi | G01S 5/0081 |
| | | | | 367/129 |
| 7,796,470 | B1 | 9/2010 | Lauder et al. | |
| 8,005,631 | B2* | 8/2011 | Barger | G01S 5/22 |
| | | | | 702/60 |
| 8,325,563 | B2 | 12/2012 | Calhoun et al. | |
| 9,689,966 | B2* | 6/2017 | Damarla | H04R 3/005 |
| 10,089,845 | B2 | 10/2018 | Skorpik et al. | |
| 10,290,195 | B2 | 5/2019 | Skorpik et al. | |
| 10,741,038 | B2 | 8/2020 | Skorpik et al. | |
| 10,816,640 | B2* | 10/2020 | Xie | G01S 5/30 |
| 11,112,418 | B1* | 9/2021 | Holmes | G01N 35/0099 |
| 2001/0004601 | A1* | 6/2001 | Drane | H04W 64/00 |
| | | | | 342/357.31 |
| 2003/0214405 | A1* | 11/2003 | Lerg | B60C 23/063 |
| | | | | 340/565 |
| 2004/0036602 | A1* | 2/2004 | Lerg | G08B 15/00 |
| | | | | 340/540 |
| 2004/0100868 | A1* | 5/2004 | Patterson, Jr. | G01R 31/085 |
| | | | | 367/127 |
| 2007/0159924 | A1 | 7/2007 | Vook et al. | |
| 2008/0165621 | A1* | 7/2008 | Fisher | G01S 5/22 |
| | | | | 367/118 |
| 2008/0219100 | A1* | 9/2008 | Fisher | G01S 5/30 |
| | | | | 367/124 |
| 2008/0267012 | A1* | 10/2008 | Fisher | F41H 13/00 |
| | | | | 367/127 |
| 2010/0118658 | A1* | 5/2010 | Showen | G01S 5/18 |
| | | | | 367/127 |
| 2013/0192451 | A1* | 8/2013 | Scott | F41G 3/147 |
| | | | | 89/41.05 |
| 2013/0206901 | A1* | 8/2013 | Herman | F41G 3/147 |
| | | | | 244/1 R |
| 2014/0269199 | A1* | 9/2014 | Weldon | G01S 5/18 |
| | | | | 367/124 |
| 2014/0314250 | A1 | 10/2014 | Park et al. | |
| 2015/0345907 | A1* | 12/2015 | Varga | F41G 3/147 |
| | | | | 89/41.05 |
| 2016/0063987 | A1 | 3/2016 | Xu et al. | |
| 2016/0260307 | A1 | 9/2016 | Skorpik et al. | |
| 2017/0003376 | A1* | 1/2017 | Wellman | H04K 3/822 |
| 2017/0123038 | A1* | 5/2017 | Griggs | G08B 29/188 |
| 2017/0169686 | A1* | 6/2017 | Skorpik | G08B 29/185 |
| 2017/0180926 | A1* | 6/2017 | Doherty | H04W 64/00 |
| 2017/0234966 | A1* | 8/2017 | Naguib | G01S 13/86 |
| | | | | 367/117 |
| 2017/0328683 | A1* | 11/2017 | Smith | F41G 7/308 |
| 2017/0328983 | A1 | 11/2017 | Volgyesi et al. | |
| 2018/0105270 | A1 | 4/2018 | Xu et al. | |
| 2018/0164397 | A1* | 6/2018 | Griggs | G01S 3/808 |
| 2018/0306890 | A1 | 10/2018 | Vatcher et al. | |
| 2018/0356492 | A1* | 12/2018 | Hamilton | G01S 13/76 |
| 2019/0101613 | A1* | 4/2019 | Griggs | G01S 5/18 |
| 2019/0162812 | A1* | 5/2019 | Sloan | G01S 3/8083 |
| 2019/0212186 | A1* | 7/2019 | Warren | H04R 29/00 |
| 2019/0228629 | A1 | 7/2019 | Skorpik et al. | |
| 2019/0281259 | A1* | 9/2019 | Palazzolo | H04N 7/183 |
| 2020/0355780 | A1 | 11/2020 | Griggs et al. | |
| 2021/0021763 | A1* | 1/2021 | Zhou | G01S 3/808 |
| 2021/0304784 | A1 | 9/2021 | Paine | |
| 2021/0389412 | A1 | 12/2021 | Gonzalez et al. | |
| 2023/0184880 | A1 | 6/2023 | Hughes et al. | |

FOREIGN PATENT DOCUMENTS

| | | | |
|---|---|---|---|
| KR | 10-2015-0000441 | 1/2015 | |
| WO | WO 2009/085361 | 7/2009 | |
| WO | WO 2010/039130 | 4/2010 | |
| WO | WO-2010039130 A1 * | 4/2010 | G08B 17/04 |
| WO | WO 2016/029469 | 3/2016 | |
| WO | WO 2020/236607 | 11/2020 | |
| WO | WO 2021/046062 | 3/2021 | |
| WO | PCT/US2020/033167 | 11/2021 | |
| WO | PCT/US2020/048957 | 3/2022 | |

OTHER PUBLICATIONS

Albert, "Low Frequency Acoustic Pulse Propagation in Temperate Forests", The Journal of the Acoustical Society of America, Aug. 2015, United States, pp. 735-747.

Beck et al., "Variations in Recorded Acoustic Gunshot Waveforms Generated by Small Firearms", The Journal of the Acoustical Society of America, Apr. 2011, United States, pp. 1748-1759.

Freire, "Robust Direction-of-Arrival by Matched-Lags, Applied to Gunshots", The Journal of the Acoustical Society of America, Jun. 2014, United States, pp. 246-251.

Gonzalez et al., "Portal System for Real-Time Gunshot Detection, Localization, Alerting, and Recording", PNNL-SA-147910 Report, Dec. 12, 2019, United States, 9 pages.

Gonzalez et al., U.S. Appl. No. 62/849,877, filed May 18, 2019, titled "Low-Cost Highly Accurate Microphone Array for Echo-Location of Gunshots", 53 pages.

Gonzalez et al., U.S. Appl. No. 62/895,397, filed Sep. 3, 2019, titled "Portable System for Real-Time Gunshot Detection, Localization, Alert, and Recording", 15 pages.

Hughes et al., "Joint Entropy of Continuously Differentiable Ultrasonic Waveforms", The Journal of the Acoustical Society of America, Jan. 2013, United States, pp. 283-300.

Hughes et al., U.S. Appl. No. 17/547,665, filed Dec. 10, 2021, titled "Waveform Emission Location Determination Systems and Associated Methods", 40 pages.

Luzi et al., "Acoustic Firearm Discharge Detection and Classification in an Enclosed Environment", The Journal of the Acoustical Society of America, May 2016, United States, pp. 2723-2731.

Mehra et al., "Acoustic Pulse Propagation in an Urban Environment Using a Three-Dimensional Numerical Simulation", The Journal of the Acoustical Society of America, Jun. 2014, United States, pp. 3231-3242.

Mohan et al., "Localization of Multiple Acoustic Sources with Small Arrays Using a Coherence Test", The Journal of the Acoustical Society of America, Apr. 2008, United States, pp. 2136-2147.

Muhlestein et al., "Acoustic Pulse Propagation in Forests", The Journal of the Acoustical Society of America, Feb. 2018, United States, pp. 968-979.

PNNL, "Portal System for Real-Time Gunshot Detection, Localization, Alerting, and Recording", PNNL-SA-147910 Brochure, 2019, United States, 1 page.

Seybold, "Introduction to RF Propagation", Wiley-Interscience, John Wiley & Sons, Inc., 2005, United States, 342 pages.

Wikipedia, "68-95-99.7 Rule", available online at https://en.wikipedia.org/wiki/68%E2%80%9395%E2%80%9399.7_rule, Apr. 8, 2019, 4 pages.

Wu et al., "Blind Extraction and Localization of Sound Sources Using Point Sources Based Approaches", The Journal of the Acoustical Society of America, Aug. 2012, United States, pp. 904-917.

Wu et al., "Passive Sonic Detection and Ranging for Locating Sound Sources", The Journal of the Acoustical Society of America, Jun. 2013, United States, pp. 4054-4064.

* cited by examiner

FIREARM DISCHARGE LOCATION SYSTEMS AND ASSOCIATED METHODS

RELATED PATENT DATA

This application claims the benefit of U.S. Provisional Patent Application Ser. No. 62/895,397, filed Sep. 3, 2019, entitled "Portable System for Real-Time Gunshot Detection, Localization, Alert, and Recording", the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to firearm discharge location systems and associated methods of identifying a location of a firearm discharge.

BACKGROUND OF THE DISCLOSURE

Increased concern regarding the number and complexity of public shootings has resulted in enhanced desire to detect the shootings as early as possible in efforts to protect unarmed members of the public. While a variety of technologies have been created and deployed for sensing and locating shooters in such an instance, there is still a significant need for improvement.

Firearm discharges such as gunshots are significant energy events having both large audio decibel levels and long signal durations of up to half a second. Rapid identification of the location of a firearm discharge allows first responders to locate and engage the shooter as quickly as possible as well as search for potential victims. Information related to the detection and location of the shooter can be some of the most critical information provided to first responders.

Aspects of the present disclosure described below are directed to firearm discharge location systems and related methods that provide accurate information regarding a location of a firearm discharge.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

The present disclosure is directed to sensor systems and associated methods that can detect firearm discharges (e.g., gunshots) in different environments, including both confined environments as well as open outdoor environments, and determine additional information, such as location of the firearm discharges. In some embodiments, plural intersecting constant-time hyperbolas are used to identify the location of a shooter within an area being monitored as discussed further below.

Figure 1:
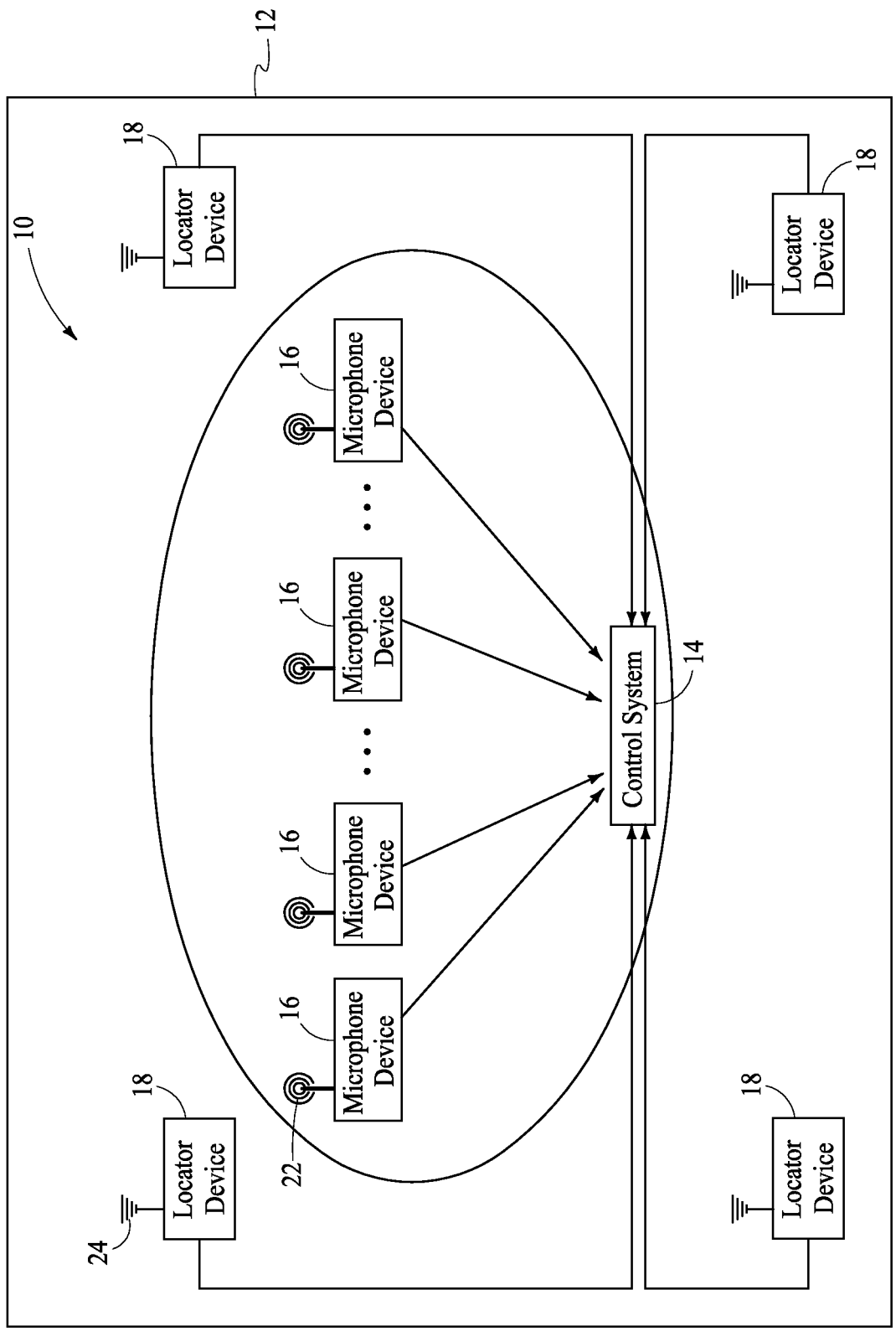
FIG. 1 is a functional block diagram of a firearm discharge location system according to one embodiment.

Referring to FIG. 1, a firearm discharge location system 10 is shown according to one embodiment. The firearm discharge location system 10 is deployed to monitor for the presence of firearm discharges within an associated area which may be indoors or outdoors, and for example include schools, airports, government buildings, parking lots, meeting venues, sporting venues, shopping malls, etc. The illustrated example system 10 includes a control system 14, a plurality of microphone devices 16, and a plurality of locator devices 18.

An example embodiment of the control system 14 is discussed in further detail below with respect to FIG. 2.

In one embodiment, the microphone devices 16 are positioned within the area 12 to be monitored and receive acoustic signals (such as those resulting from firearm discharges). Microphones within the microphone devices 16 output electrical signals corresponding to the received acoustic signals. The microphone devices 16 are configured to generate information regarding the received acoustic signals that correspond to firearm discharges, such as the times of arrival of the acoustic signals at the microphone devices 16.

The locator devices 18 are part of a microphone locator system in the described embodiment that is configured to monitor the positions of the microphone devices 16 during firearm discharge monitoring operations of system 10. The locator devices 18 are positioned at a plurality of known locations with respect to a coordinate system. Any appropriate coordinate system may be used including GPS or a grid laid out by hand within the area to be monitored.

The locator devices 18 of the microphone locator system (that also includes processing circuitry of the control system 14 discussed below) are configured to continuously monitor the positions of the microphone devices 16 at a plurality of moments in time in one embodiment. The locator system is configured to identify the locations of the microphone devices 16 at the different moments in time during monitoring for the presence of firearm discharges by the microphone devices 16.

In one embodiment, the microphone devices 16 each include an emitter 22 that is configured to output an identification signal externally of the individual device. In a more specific embodiment, the emitter 22 is implemented as a beacon that is configured to emit the identification signals continually over time during monitoring of firearm discharges by the system 10. For example, the identification signals may be emitted periodically every 1-3 seconds in one implementation and with a range of approximately 100 m. The identification signals uniquely identify the specific microphone device 16 emitting the identification signals in one embodiment.

In one embodiment, emitter 22 comprises an antenna configured to emit the identification signals in the form of wireless electromagnetic signals that are received by antennas 24 of the locator devices 18. In another embodiment, microphone devices 16 emit the identification signals in the form of acoustic signals that are received by the locator devices 18.

The identification signals are used by the microphone locator system to monitor the positions of the microphone devices 16 as discussed below. The locator devices 18 receive the emitted identification signals and are configured to generate information regarding the received identification signals, such as the times of arrival of the identification signal from a given microphone device 16, and to communicate the generated information to control system 14. In addition, the microphone devices 16 are configured to communicate the generated information regarding the received acoustic signals that correspond to firearm discharges to control system 14.

Control system 14 processes the information regarding the identification signals received by the locator devices 18 to determine the locations of each of the microphone devices 16. The control system 14 then uses the determined locations of the microphone devices 16 and the information regarding the acoustic signals received by the microphone devices 16 that correspond to a firearm discharge to identify the location of the firearm discharge as discussed in further detail below.

Figure 2:
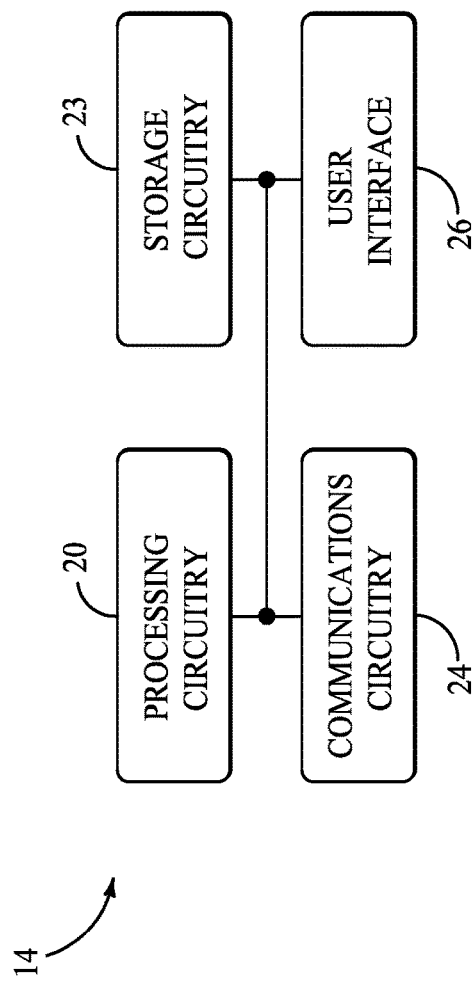
FIG. 2 is a functional block diagram of a control system according to one embodiment.

Referring to FIG. 2, one embodiment of control system 14 is shown. In the illustrated example embodiment, control system 14 includes processing circuitry 20, storage circuitry 23, communications circuitry 24 and a user interface 26. Other embodiments of control system 14 are possible including more, less and/or alternative components.

In one embodiment, processing circuitry 20 is arranged to process data, control data access and storage, issue commands, and control other desired operations of the system 10. Processing circuitry 20 may comprise circuitry configured to implement desired programming provided by appropriate computer-readable storage media in at least one embodiment. For example, the processing circuitry 20 may be implemented as one or more processor(s) and/or other structure configured to execute executable instructions including, for example, software and/or firmware instructions. Other example embodiments of processing circuitry 20 include hardware logic, PGA, FPGA, ASIC, state machines, and/or other structures alone or in combination with one or more processor(s). These examples of processing circuitry 20 are for illustration and other configurations are possible.

In one embodiment, processing circuitry 20 of control system 14 is configured to process outputs of the locator devices 18 to identify locations of the microphone devices 16 during firearm discharge monitoring operations of system 10. Outputs of the locator devices 18 include information regarding the identification signals received by the locator devices 18 and the outputs are processed by the processing circuitry 20 to determine the locations of the microphone devices 16. Information regarding acoustic signals received by the microphone devices 16 resulting from a firearm discharge and the determined locations of the microphone devices 16 are processed by the processing circuitry 20 to identify the location of a firearm discharge within an area being monitored as discussed further below.

Additional processing circuitry of the firearm discharge monitoring system 10 may be provided in additional components of the system 10 in some embodiments. For example, one or both of the microphone devices 16 and/or locator devices 18 may also include processing circuitry to perform operations described herein. In addition, other embodiments of system 10 may include a plurality of sub-controllers each having respective processing circuitry as well as a group of a plurality of associated microphone devices 16 as discussed below with respect to an example implementation in FIG. 4.

Storage circuitry 23 is configured to store programming, such as executable code or instructions (e.g., software and/or firmware), electronic data, or other digital information and may include computer-readable storage media. At least some embodiments or aspects described herein may be implemented using programming stored within one or more computer-readable storage medium of storage circuitry 23 and configured to control processing circuitry 20.

The computer-readable storage medium may be embodied in one or more articles of manufacture which can contain, store, or maintain programming, data and/or digital information for use by or in connection with an instruction execution system including processing circuitry 20 in one embodiment. For example, computer-readable storage media may be non-transitory and include any one of physical media such as electronic, magnetic, optical, electromagnetic, infrared or semiconductor media. Some more specific examples of computer-readable storage media include random access memory and read only memory capable of storing programming, data, or other digital information.

Communications circuitry 24 is arranged to implement communications of control system 14 with respect to external devices, such as microphone devices 16, locator devices 18 or sub-controllers discussed below. Communications interface 18 may be implemented as wired or wireless communications circuitry for implementing communications of the control system 14 with respect to external devices.

User interface 26 is configured to interact with a user including conveying data to a user (e.g., displaying visual images for observation by the user) as well as receiving inputs from the user. More specifically, user interface 26 may communicate the results of processing performed by the firearm discharge location system including displaying information such as the coordinates of the location of a firearm discharge within the area being monitored in one embodiment. In one embodiment, the user interface 26 displays the location of the firearm discharge using coordinates of the coordinate system defined by the microphone locator system. User interface 26 is configured as a graphical user interface (GUI) in one embodiment, however other implementations may be used.

Figure 3:
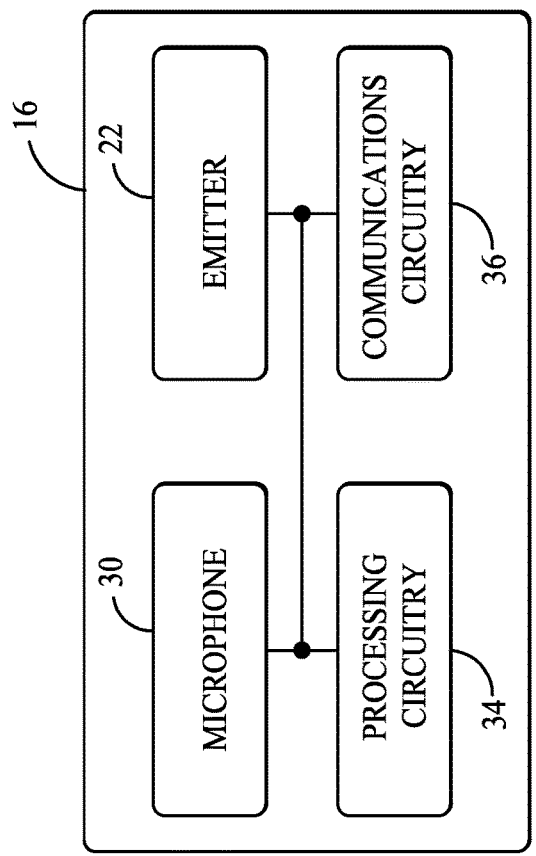
FIG. 3 is a functional block diagram of a microphone device according to one embodiment.

Referring to FIG. 3, one embodiment of a microphone device 16 is shown. The example microphone device 16 includes emitter 22, a microphone 30, processing circuitry 34 and communication circuitry 36. Other embodiments of microphone device 14 are possible including more, less and/or alternative components.

As mentioned above, emitter 22 is configured to emit an identification signal, such as an electromagnetic signal or acoustic signal, externally of the microphone device 16 and that may uniquely identify the microphone device 16. For example, the identification signals may be electromagnetic signals having unique bursts of different frequencies that enable the transmitting microphone device 16 to be identified. In another example, emitter 22 emits an acoustic signal having a unique tone burst of different frequencies that enable the transmitting microphone device 16 to be identified. In yet another example, emitter 22 transmits electromagnetic or acoustic identification signals that are pulsecoded enabling matched filter identification of the identification signals from the microphone devices 16.

Microphone 30 is configured to receive acoustic signals and output electrical signals corresponding thereto. For example, the microphone 30 generates and outputs electrical signals responsive to acoustic signals originating from a firearm discharge and that are received by microphone 30.

Processing circuitry 34 may be configured similarly to processing circuitry 20 discussed above. In one embodiment, processing circuitry 34 generates information corresponding to acoustic signals resulting from firearm discharges that are received by the microphones 30. In one embodiment, the processing circuitry 34 generates time stamps indicating the time of arrival of the acoustic signal at the respective microphone device 16. The generated information from the different microphone devices 16 receiving the acoustic signals resulting from a firearm discharge are processed to identify the location of the firearm discharge as discussed further below.

Communications circuitry 36 is configured to communicate the generated information and outputs of the microphone 30 indicative of the received acoustic signals corresponding to the firearm discharge externally of the microphone device 16 to control system 14. Communications circuitry 36 may communicate via wired or wireless signals in different embodiments.

In one embodiment, the locator devices 18 are configured similarly as the microphone devices 16 except the emitter 22 is replaced with an antenna 24 in arrangements where the emitters 22 of the microphone devices 16 emit electromagnetic signals.

The antennas 24 receive the identification signals emitted from emitters 22 and processing circuitry of the locator devices 18 is configured to generate information regarding the received identification signals. In one embodiment, the processing circuitry generates the information comprising a plurality of moments in time when the identification signals are received by the locator devices 18. In one embodiment, the processing circuitry records time stamps when the identification signals are received by the locator devices 18. The time stamps are indicative of the times of arrival of the identification signal from one of the microphone devices 16 at each of the locator devices 18. Communication circuitry of the locator devices 18 communicates the generated information to control system 14.

Control system 14 may also be considered to be a component of the locator system comprising the locator devices 18 and processing circuitry of control system 14 is configured to use the moments in time when the identification signal from one of the microphone devices 16 is received by the locator devices 18 to identify the location(s) of the one microphone device 16 during the emission of the identification signal. As discussed further below, an identification signal from one of the microphone devices 16 arrives at the locator devices 18 at different times due to the different distances from the one microphone device 16 to the locator devices 18. The difference in the time of arrival of the identification signal at the locator devices 18 is used by the processing circuitry 20 to identify the location of the one microphone device 16. Additionally, the identification signals emitted from the other microphone devices 16 are used to determine the locations of the other microphone devices 16.

Processing circuitry of the microphone devices 16 are also configured to generate time stamps indicating a plurality of moments in time that acoustic signals corresponding to a firearm discharge are received by the microphone devices 16. Since the microphone devices 16 are positioned at different locations, the acoustic signals corresponding to a firearm discharge are received at the microphone devices 16 at different moments in time. The time stamps corresponding to the different times of arrival of the acoustic signals of the firearm discharge at the different microphone devices 16 are used by the processing circuitry 20 along with the determined locations of the microphone devices 16 to identify the location of the firearm discharge in one embodiment.

Further details regarding determination of the locations of the microphone devices 16 and the firearm discharge using different times of arrival of the identification signals and the acoustic signals of a firearm discharge are discussed below with respect to FIG. 5.

Figure 4:
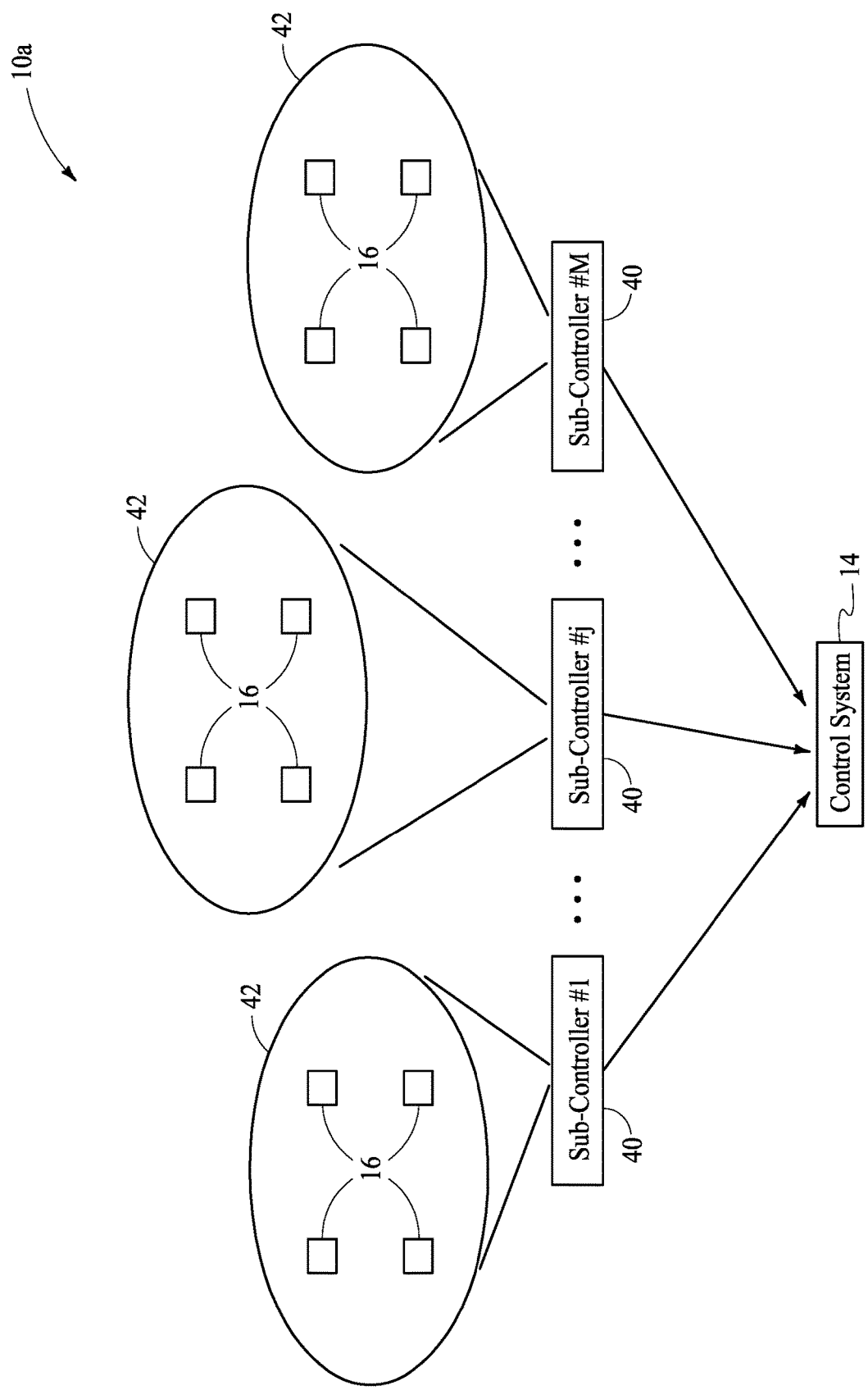
FIG. 4 is an illustrative representation of a firearm discharge location system according to one embodiment.

Referring to FIG. 4, another embodiment of firearm location detection system 10a is shown. The illustrated system 10a includes a plurality of sub-controllers 40 that may be configured similarly to control system 14 described above in one embodiment. Each of the sub-controllers 40 is associated with and configured to process information regarding a group 42 of respective microphone devices 16 (four of the microphone devices 16 in the illustrated example embodiment) as identified by the respective identification signals to identify the position or location of a firearm discharge.

Although not shown in FIG. 4, the system 10a further includes a microphone device locator system configured to monitor the locations of the microphone devices 16 that are associated with the plurality of sub-controllers 40. A plurality of locator devices 18 of the locator system are positioned at known locations in the area to be monitored and receive the identification signals emitted by the microphone devices 16. The locator devices 18 generate time stamps at moments in time corresponding to the arrival of the identification signals at the locator devices 18 and the time stamps are communicated to the respective sub-controllers 40 that are associated with the microphone devices 16 that emitted the received identification signals. Processing circuitry of each of the sub-controllers 40 is configured to process the time stamps from the locator devices 18 regarding times of arrival of the identification signals from the microphone devices 16 of the group 42 that is associated with the respective sub-controller 40 to identify the locations of the microphone devices 16 of the group 42 that is associated with the respective sub-controller 40.

In addition, information regarding acoustic signals corresponding to a firearm discharge and received by the microphone devices 16 is also communicated to the communication circuitry of the respective sub-controllers 40 associated with the microphone devices 16. For example, the microphone devices 16 communicate time stamps that were generated resulting from the reception of acoustic signals of a firearm discharge by the microphone devices 16 to the respective sub-controllers 40.

The processing circuitry of each sub-controller 40 is further configured to use the information regarding the acoustic signals of the firearm discharge generated by the microphone devices 16 of the respective group 42 and the identified locations of the microphone devices 16 of the respective group 42 to identify a plurality of preliminary locations of the firearm discharge. In one embodiment, these identified preliminary locations of the firearm discharge may be communicated to control system 14 and processing circuitry 20 thereof is configured to combine the different preliminary locations of the firearm discharge identified by the different sub-controllers 40 to determine an updated or final location of the firearm discharge that may be communicated and used for first response efforts to the firearm discharge.

Control system 14 may combine the identified preliminary locations of the firearm discharge from the sub-controllers 40 in different ways. In one example, each of the preliminary locations of the firearm discharge may be indicated as a vector with an associated error. Identified preliminary locations of the firearm discharge with reduced error compared with others of the identified preliminary locations may be weighted an increased amount during combination compared with identified preliminary locations of the firearm discharge with increased error in one embodiment.

In one more specific example, the preliminary location of the firearm discharge may be represented by $\sim x_j \pm \sim e_j$, where vector $\sim x$ is the identified location in 3D space having x,y,x coordinates $(x_{j,1}, x_{j,2}, x_{j,3})$ and $\sim e_j$ is an error vector in 3D space having x,y,x coordinates $(e_{j,1}, e_{j,2}, e_{j,3})$. M is the total number of sub-controllers 40 (indexed by symbol j=1, . . . , M), each associated with a group 42 of $N_j$ microphone devices 16 (indexed by symbol i=1, . . . , $N_1$)). Although this number may be the same for all sub-controllers 40, it need not be.

If the sub-controllers 40 return the preliminary locations of the firearm discharge with coordinates $\sim x_j \pm \sim e_j$, a weighted sum would take the form $$\langle x \rangle = \sum_{j=1}^{M} \frac{x_j w_j(\|\vec{e}_j\|_p)}{w_j(\|\vec{e}_j\|_p)}, \quad (1)$$

Where $$w_j(\|\vec{e}_j\|_p) \equiv \frac{\|\vec{e}_j\|_p^{-1}}{\sum_{j=1}^{M} \|\vec{e}_j\|_p^{-1}}, \quad (2)$$

and where $k \sim e_j k_p$ denotes the $L_p$-norm of $\sim e_j$. Another possibility is $$w_j(\|\vec{e}_j\|_p) \equiv \frac{e^{-\|\vec{e}_j\|_p}}{\sum_{j=1}^{M} e^{-\|\vec{e}_j\|_p}}, \quad (3)$$

or $$w_j(\|\vec{e}_j\|_p) \equiv \frac{\varphi(\|\vec{e}_j\|_p)}{\sum_{j=1}^{M} \varphi(\|\vec{e}_j\|_p)}, \quad (4)$$

with $\varphi(x)$ being any bounded function that decreases for $x \geq 0$ as $x \to \infty$ and the weight functions $w_j$ satisfy the convexity condition $$1 = \sum_{j=1}^{M} w_j \quad (5)$$

Combination of the preliminary locations of the firearm discharge may also be implemented using Bayesian techniques in other embodiments.

Figure 5:
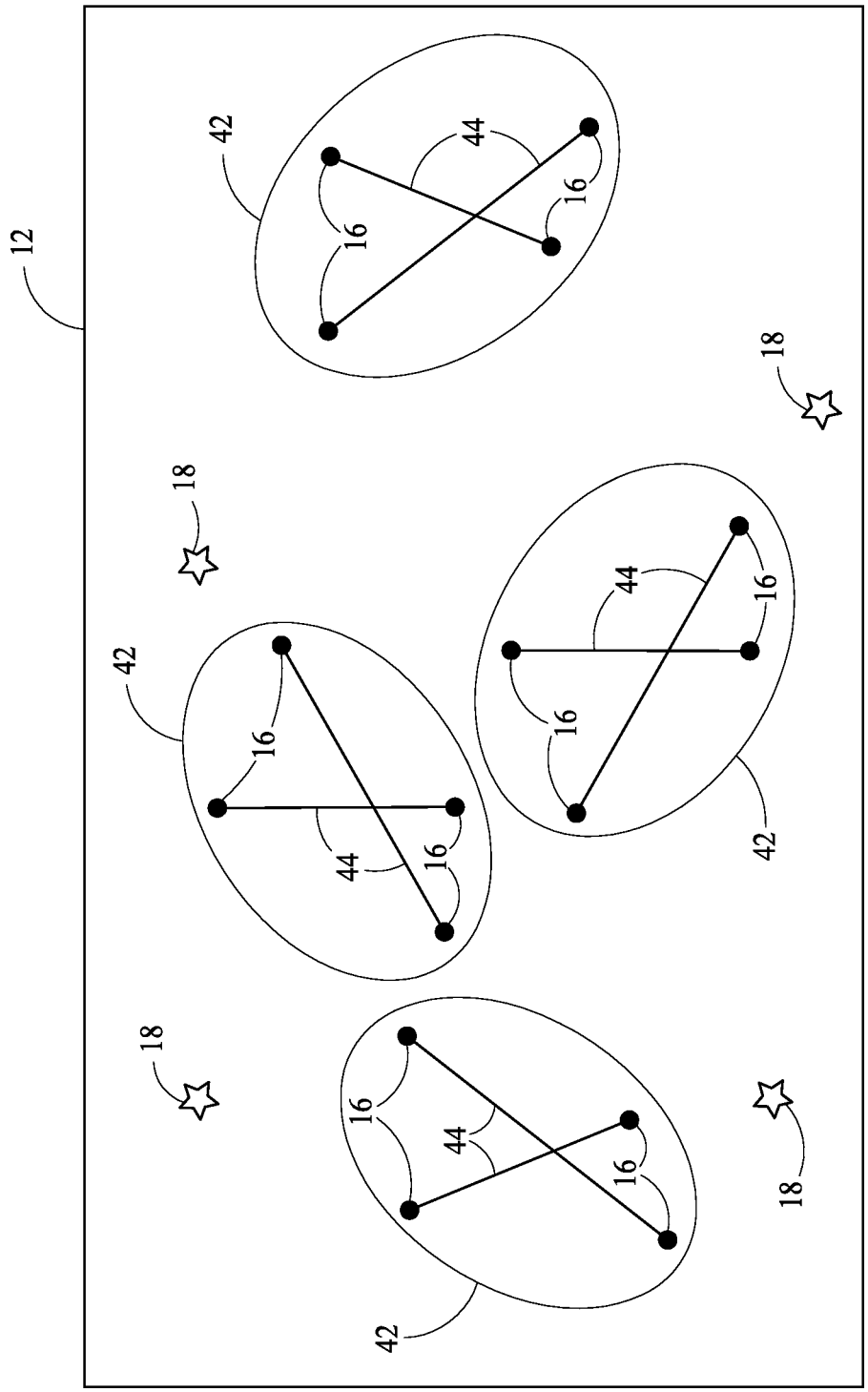
FIG. 5 is an illustrative representation of a plurality of groups of microphone devices of a firearm discharge location system according to one embodiment.

Referring to FIG. 5, a locator system including at least four locator devices 18 is configured to monitor the locations of the microphone devices 16 of a plurality of different groups 42 in one embodiment. In particular, the locator devices 18 receive the identification signals emitted from each of the microphone devices 16. In some embodiments, the identification signals each include a unique code that may be used to identify the specific microphone device 16 transmitting the received identification signals.

In one embodiment, processing circuitry of the locator devices 18 time stamps each of the received identification signals indicating the moments in times of arrival of the identification signals at the respective locator devices 18 and controls the communication circuitry of the locator device 18 to communicate the time stamps indicating the times of arrival of the identification signals to the respective sub-controllers 40 (sub-controllers 40 are shown in FIG. 4 according to one embodiment) associated with the microphone devices 16 that communicated the identification signals. The individual sub-controllers 40 are configured to process the time stamps to identify the locations of the microphone devices 16 of the respective group 42 at different moments in time (e.g., periodically). Thereafter, each of the sub-controllers 40 processes the information (e.g., time stamps) regarding the received acoustic signals and locations of the microphone devices 16 when the acoustic signals were received by the microphone devices 16 to provide information regarding the location of the firearm discharge as discussed further below.

In one embodiment, processing circuitry of an individual sub-controller 40 determines the locations of the microphone devices 16 that are associated with the individual sub-controller 40 using intersecting constant-time hyperbolas as discussed in a PCT Patent Application entitled "Firearm Discharge Location Systems and Methods", having serial number PCT/US2020/033167, filed on May 15, 2020, naming Eric G. Gonzalez, Michael S. Hughes, and Anton S. Sinkov as inventors, and the teachings of which are incorporated herein by reference.

Example embodiments of this PCT application include receiving devices that may be considered to correspond to microphone devices or locator devices of the present application. A first pair of the locator devices (or microphone devices) are synchronized with one another with respect to time and a second pair of the locator devices (or microphone devices) are synchronized with one another with respect to time. The different pairs are not synchronized in time with each other in one embodiment although synchronization of the pairs with respect to time may also be implemented in other embodiments.

Each pair of receiving devices has an axis 44 between the devices of the pair. The axes 44 of the pairs of synchronized receiving devices are not parallel but rather intersect one another and divide an area into four distinct half planes. Points of intersection of hyperbolas determined by time differences of signals received by the receiving devices are used to identify the location of the emission of the received signals (i.e., identify the location of the microphone devices 16 emitting the identification signals and the location of the source of the acoustic signals corresponding to the firearm discharge). The time stamps of the reception of the identification signals and the time stamps of the reception of the acoustic signals of a firearm discharge discussed above may be used to determine the time differences of the arrival of the signals in one embodiment. Further details regarding use of time of arrival or time differences of received signals to identify the locations of the source of the signals are discussed in the PCT application incorporated by reference above. As discussed in the PCT application, the time stamps generated by the receiving devices of a first pair may be separately processed from the time stamps generated by the receiving devices of a second pair to identify the locations of the microphone devices and the firearm discharge.

In one embodiment, the locations of the locator devices 18 are known and the locator devices 18 in the upper left and lower right regions of area 12 may be synchronized in time with one another and the devices 18 in the lower left and upper right are synchronized in time with one another. The axes of the synchronized pairs of locator devices 18 (not shown in FIG. 5) intersect and divide an area into four distinct half planes and time stamps are generated by each of the locator devices 18 corresponding to the timing of the reception of the identification signals from the microphone devices 16. In one embodiment, points of intersection of hyperbolas determined by time differences of the identification signals received by the locator devices 18 are used to identify the locations of the microphone devices 16 as discussed in the PCT application incorporated by reference above.

The location of a firearm discharge may be identified using the identified locations of the microphone devices 16 and information (e.g., time stamps) regarding acoustic signals received by the microphone devices 16 in one embodiment. The axes 44 of the pairs of synchronized microphone devices 16 are not parallel but rather intersect and divide an area into four distinct half planes. Time stamps are generated by each of the microphone devices 16 corresponding to the timing of the reception of the acoustic signals by the microphone devices 16 in one embodiment. In one embodiment, points of intersection of hyperbolas determined by time differences of the acoustic signals received by the microphone devices 16 are used to identify the location of the firearm discharge as discussed in the PCT application incorporated by reference above.

Accordingly, in the example embodiment of FIG. 5, each of the sub-controllers 40 for the different groups 42 of microphone devices 16 determines its own preliminary location of the firearm discharge. These identified locations of the firearm discharge may be communicated to the control system 14 that processes the preliminary locations of the firearm discharge identified by the sub-controllers 40 to provide an updated or final location of the firearm discharge as discussed previously.

Referring again to the embodiment of FIG. 1, only one group of two independent pairs of synchronized microphone devices 16 are provided in the firearm discharge location system 10 and sub-controllers 40 are not utilized. In this embodiment, the microphone devices 16 communicate their respective information regarding the received acoustic signals of a firearm discharge to the control system 14 and the locator devices 18 communicate their respective information regarding the reception of the identification signals from the microphone devices 16 to the control system 14. Processing circuitry 20 of control system 14 is configured to process the information (e.g., time stamps) regarding the reception of the identification signals from the microphone devices 16 to identify the locations of the microphone devices 16. The processing circuitry 20 is further configured to process the locations of the microphone devices 16 and the information (e.g., time stamps) regarding the reception of the acoustic signals resulting from the firearm discharge by the microphone devices 14 to determine the location of the firearm discharge in one embodiment.

In one example implementation, the firearm discharge location system is comprised of a portable case that can be hand carried by a single person and easily setup by one or two people at an area to be monitored for firearm discharges. The case includes the microphone devices, locator devices, sub-controllers and the control system in one embodiment. The components may be battery powered to facilitate installation and placement thereof within the area to be monitored.

By monitoring the locations of the microphone devices 16 during operation according to some embodiments discussed herein, the microphone devices 16 are not required to be precisely placed at known locations in order for locations of firearm discharges to be accurately determined by the system 10. In addition, the microphone devices 16 may be moved (for example being attached to a balloon that is anchored to a fixed basepoint in a venue being monitored or mounted to security personnel) during monitoring for firearm discharges in some embodiments and the locations of the monitoring devices 18 are continually (e.g., periodically) monitored during operation of system 10. The monitoring of the locations of the microphone devices 16 enables easy and rapid deployment of the system 10 in short time while increasing the robustness of the estimates of the identified locations of firearm discharges and shooters.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A firearm discharge location system comprising:
   a plurality of microphone devices individually configured to receive acoustic signals of a firearm discharge and to generate information regarding the acoustic signals of the firearm discharge;
   a locator system configured to monitor the plural microphone devices to identify a plurality of locations of the microphone devices during the generation of the information regarding the acoustic signals of the firearm discharge by the microphone devices;
   processing circuitry configured to use the locations of the microphone devices and the information regarding the acoustic signals of the firearm discharge to identify the location of the firearm discharge;
   wherein each of the microphone devices comprises an emitter configured to output an identification signal and the locator system is configured to receive the identification signals from the microphone devices and to use the identification signals to monitor the locations of the microphone devices;

wherein the locator system comprises a plurality of locator devices positioned at different locations and individually configured to receive the identification signals from the microphone devices and to generate information regarding the identification signals, and the processing circuitry is configured to use the information regarding the identification signals to identify the locations of the microphone devices; and wherein the locator system comprises at least four of the locator devices, and a first pair of the locator devices are synchronized with one another with respect to time and a second pair of the locator devices are synchronized with one another with respect to time, and wherein the first and second pairs of the locator devices are synchronized independent of one another.

2. The system of claim 1 wherein the processing circuitry is configured to separately process the information regarding the identification signals from each of the pairs of the locator devices to identify the locations of the microphone devices.

3. The system of claim 1 wherein each of the pairs of the locator devices defines an axis, and the axes of the pairs of the locator devices intersect one another and are not parallel with one another.

4. A firearm discharge location system comprising:
a plurality of microphone devices individually configured to receive acoustic signals of a firearm discharge and to generate information regarding the acoustic signals of the firearm discharge;
a locator system configured to monitor the plural microphone devices to identify a plurality of locations of the microphone devices during the generation of the information regarding the acoustic signals of the firearm discharge by the microphone devices;
processing circuitry configured to use the locations of the microphone devices and the information regarding the acoustic signals of the firearm discharge to identify the location of the firearm discharge; and
wherein the microphone devices include a first pair of the microphone devices that are synchronized with one another with respect to time and a second pair of the microphone devices that are synchronized with one another with respect to time, and wherein the first and second pairs of the microphone devices are synchronized independent of one another.

5. The system of claim 4 wherein the processing circuitry is configured to separately process the information regarding the acoustic signals from each of the pairs of the microphone devices to identify the location of the firearm discharge.

6. The system of claim 4 wherein each of the pairs of the microphone devices defines an axis, and the axes of the pairs of the microphone devices intersect one another and are not parallel with one another.

7. A firearm discharge location system comprising:
a plurality of microphone devices individually configured to receive acoustic signals of a firearm discharge and to generate information regarding the acoustic signals of the firearm discharge;
a locator system configured to monitor the plural microphone devices to identify a plurality of locations of the microphone devices during the generation of the information regarding the acoustic signals of the firearm discharge by the microphone devices;
processing circuitry configured to use the locations of the microphone devices and the information regarding the acoustic signals of the firearm discharge to identify the location of the firearm discharge; and a plurality of groups of the microphone devices, and wherein the processing circuitry is configured to use the information regarding the acoustic signals of the firearm discharge for each of the groups to identify a plurality of different locations of the firearm discharge.

8. The system of claim 7 wherein the processing circuitry is configured to combine the different locations of the firearm discharge to provide an updated location of the firearm discharge.

9. A firearm discharge location system comprising:
a plurality of microphone devices individually configured to receive acoustic signals of a firearm discharge and to generate information regarding the acoustic signals of the firearm discharge;
a locator system configured to monitor the plural microphone devices to identify a plurality of locations of the microphone devices during the generation of the information regarding the acoustic signals of the firearm discharge by the microphone devices;
processing circuitry configured to use the locations of the microphone devices and the information regarding the acoustic signals of the firearm discharge to identify the location of the firearm discharge; and
wherein the microphone devices are configured to receive the acoustic signals of the firearm discharge within an associated area, and wherein the locator system comprises a plurality of locator devices positioned at different locations within the associated area and configured to monitor the locations of the microphone devices within the associated area.

10. The system of claim 9 wherein the information regarding the acoustic signals comprises a plurality of moments in time when the acoustic signals of the firearm discharge are received by the microphone devices and the processing circuitry is configured to use the moments in time to identify the location of the firearm discharge.

11. The system of claim 9 wherein the locator system is configured to monitor the locations of the microphone devices at a plurality of moments in time.

12. The system of claim 9 wherein each of the microphone devices comprises an emitter configured to output an identification signal and the locator system is configured to receive the identification signals from the microphone devices and to use the identification signals to monitor the locations of the microphone devices.

13. The system of claim 12 wherein the locator devices are individually configured to receive the identification signals from the microphone devices and to generate information regarding the identification signals, and the processing circuitry is configured to use the information regarding the identification signals to identify the locations of the microphone devices.

14. The system of claim 9 further comprising a user interface configured to communicate the location of the firearm discharge to a user.

15. The system of claim 9 wherein the processing circuitry is configured to identify the location of the firearm discharge in a coordinate system that is defined by the locator system.

16. The system of claim 9 wherein the locator system is configured to identify a plurality of points of intersection of a plurality of hyperbolas that are determined by a plurality of time differences of a plurality of identification signals received from the microphone devices to identify the locations of the microphone devices.

17. The system of claim 9 wherein the processing circuitry is configured to identify a plurality of points of intersection of a plurality of hyperbolas that are determined by a plurality of time differences of the acoustic signals received by the microphone devices to identify the location of the firearm discharge.

18. The system of claim 9 wherein the locator system that monitors the microphone devices and identifies the locations of the microphone devices is separate and remotely located from the microphone devices.

19. The system of claim 9 wherein the locator system is configured to identify the locations of all of the microphone devices that generate the information regarding the acoustic signals that is used by the processing circuitry to identify the location of the firearm discharge.

20. The system of claim 9 wherein the locator system is configured to monitor all of the microphone devices that generate the information regarding the acoustic signals to identify the locations of all of the microphone devices, and wherein the processing circuitry is configured to use the locations of all of the microphone devices to identify the location of the firearm discharge.

21. The system of claim 9 wherein the locations of the locator devices are fixed.

22. The system of claim 9 wherein the processing circuitry is configured to process outputs from the locator devices to identify the locations of the microphone devices.

23. A firearm discharge location system comprising:
a plurality of groups of microphone devices individually configured to receive acoustic signals of a firearm discharge and to generate information regarding the acoustic signals of the firearm discharge;
a locator system configured to monitor locations of the microphone devices during the generation of the information regarding the acoustic signals of the firearm discharge by the microphone devices;
processing circuitry configured to process, for each of the groups of microphone devices, the locations of the microphone devices of the respective group and the information regarding the acoustic signals of the firearm discharge generated by the microphone devices of the respective group to identify a preliminary location of the firearm discharge for the respective group of microphone devices; and
wherein the processing circuitry is further configured to process the preliminary locations of the firearm discharge that were identified for the groups of microphone devices to generate an updated location of the firearm discharge.

24. The system of claim 23 further comprising a plurality of sub-controllers corresponding to respective ones of the groups of microphone devices, and wherein each of the sub-controllers comprises a portion of the processing circuitry that is configured to process the locations of the microphone devices that correspond to the individual sub-controller and the information regarding the acoustic signals generated by the microphone devices that correspond to the individual sub-controller to identify one of the preliminary locations of the firearm discharge.

25. The system of claim 24 further comprising a control system that comprises an additional portion of the processing circuitry that is configured to process the preliminary locations of the firearm discharge to generate the updated location of the firearm discharge.

26. The system of claim 23 wherein the microphone devices are configured to generate the information regarding the acoustic signals comprising time of arrival of the acoustic signals at the microphone devices and the processing circuitry is configured to use the time of arrival of the acoustic signals at the microphone devices of the groups to identify the preliminary locations of the firearm discharge.

27. The system of claim 23 wherein each of the microphone devices comprises an emitter configured to output an identification signal and the locator system is configured to receive the identification signals and to use the identification signals to monitor the locations of the microphone devices of the groups.

28. The system of claim 23 wherein the locator system is separate and remotely located from the microphone devices.

29. The system of claim 23 wherein the locator system is configured to monitor the locations of all of the microphone devices during the generation of the information regarding the acoustic signals, and wherein the processing circuitry is configured to process the monitored locations of all of the microphone devices to identify the location of the firearm discharge.

30. The system of claim 23 wherein the processing circuitry is configured to process the preliminary locations of the firearm discharge differently including weighting the preliminary locations of the firearm discharge differently to generate the updated location of the firearm discharge.

31. The system of claim 30 wherein the processing circuitry is configured to use error associated with the preliminary locations of the firearm discharge to weight the preliminary locations of the firearm discharge differently.

* * * * *